US011341240B2

(12) United States Patent
Waldman et al.

(10) Patent No.: US 11,341,240 B2
(45) Date of Patent: May 24, 2022

(54) WEB-BASED MALWARE MITIGATION SYSTEM

(71) Applicants: Zachary Waldman, East Stroudsburg, PA (US); Samuel Neely, East Stroudsburg, PA (US)

(72) Inventors: Zachary Waldman, East Stroudsburg, PA (US); Samuel Neely, East Stroudsburg, PA (US)

(*) Notice: Subject to any disclaimer, the term of this patent is extended or adjusted under 35 U.S.C. 154(b) by 590 days.

(21) Appl. No.: 16/283,318

(22) Filed: Feb. 22, 2019

(65) Prior Publication Data
US 2019/0266328 A1    Aug. 29, 2019

Related U.S. Application Data

(60) Provisional application No. 62/634,999, filed on Feb. 26, 2018.

(51) Int. Cl.
*H04L 9/40* (2022.01)
*G06F 21/56* (2013.01)
*H04L 29/06* (2006.01)
*G06F 21/53* (2013.01)

(52) U.S. Cl.
CPC .......... *G06F 21/566* (2013.01); *G06F 21/53* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 9,201,850 B1 * | 12/2015 | Buddhiraja | G06F 40/10 |
| 9,223,962 B1 | 12/2015 | Kashyap et al. | |
| 10,079,842 B1 * | 9/2018 | Brandwine | H04L 63/1441 |
| 10,395,029 B1 * | 8/2019 | Steinberg | G06F 21/53 |
| 10,476,906 B1 * | 11/2019 | Siddiqui | H04L 63/1425 |
| 11,113,086 B1 * | 9/2021 | Steinberg | G06F 9/45558 |
| 2011/0167492 A1 | 7/2011 | Ghosh et al. | |
| 2011/0167494 A1 * | 7/2011 | Bowen | G06F 21/56 726/24 |
| 2011/0296412 A1 * | 12/2011 | Banga | G06F 9/45545 718/1 |
| 2013/0055256 A1 | 2/2013 | Banga et al. | |
| 2013/0198840 A1 * | 8/2013 | Drissi | G06F 21/552 726/22 |

* cited by examiner

*Primary Examiner* — Joseph P Hirl
*Assistant Examiner* — Hassan Saadoun
(74) *Attorney, Agent, or Firm* — James R. McDaniel; Lawrence P. Zale

(57) ABSTRACT

A system for reducing the effects of unwanted software ("malware") is described having a user computing device which runs on a user operating system (UOS) and a user web browser coupled by a limited communication link to a host computing device including VM executable code for emulating a virtual machine, a virtual OS which runs on the virtual machine and a web browser adapted to run on the virtual OS. The limited communication link connected between the user computing device and the host computing device is adapted to pass certain user input communications (signals from the input devices) from the user computing device to the host computing device; and pass certain output communications (signals to output devices) from the host computing device to the user computing device thereby restricting malware from being introduced to the user computing device.

8 Claims, 5 Drawing Sheets

WEB-BASED MALWARE MITIGATION SYSTEM

CROSS REFERENCE TO RELATED APPLICATIONS

This application claims the benefit of U.S. Provisional Patent Application 62/634,999, "Web-Based Malware Mitigation System" by the same inventors as the current application, Zachary Waldman and Samuel Neely, filed Feb. 26, 2018, and is hereby incorporated by reference to the extent that it does not conflict with the current application.

STATEMENT REGARDING FEDERALLY SPONSORED RESEARCH

Not applicable.

BACKGROUND OF THE INVENTION

1. Field of the Invention

The current invention relates to a system which runs an application program that is resistant to malware attacks, and more specifically to a system that runs an application program in a virtual machine that is resistant to malware attacks.

2. Description of Related Art

When Windows XP was introduced, malicious downloads, browser exploits, and worms like Sasser and Blaster were common as described in "Windows XP Security Vulnerabilities", MITRE Corporation, id-739, McLean, Va., 2017.

At the time, Microsoft had just made the transition to using the business-oriented Windows NT core in their home operating systems. This coincided with both the rise of high-speed Internet connections in the common household, and the rise of the ubiquity of the Internet.

This dramatic increase in connectivity happened over a brief period, with little thought given to security. In 2005, hackers were able to exploit these poor security practices and attack users' computers without their knowledge. Users were vulnerable to attacks over the Internet.

However, the world of technology moves quickly, and since then, computer security has changed. Security protocols in modern operating systems have become quite resilient to common attacks, save for the odd zero-day that can be patched once found, as described in Bilge, Leyla, and Tudor Dumitras, "Before We Knew it: an Empirical Study of Zero-Day Attacks in the Real World," in ACM Computer Communications Security, N.C., 2012, 833-844.

The new world of malware is not intended to destroy the host computer; its goal is to extract information or computing power out of the compromised machine, to generate revenue for the attackers. Modern malware does not prey solely on security flaws in operating systems anymore, instead, we believe that it leverages the relative inexperience of the common user. Ransomware and adware are most often installed with the user's unknowing approval. Antivirus and anti-malware software are powerless to defend against attacks from downloads which the user has approved. The modern operating system was designed to give the user ultimate control over their system. Anti-malware software and heuristic technology can only detect these kinds of attacks after they start doing damage, or after they have been around long enough for a signature to be developed (Sharma, Priya, and Jyoti Arora., "A Review on Malware Detection Schemes Using Machine Learning Techniques," International Journal of Engineering Development and Research, Volume 4, Issue 2, ISSN: 2321-9939, 170-172).

Currently, there is a need for a system which provides increased protection against the effects of malware on computing devices and which has comparable performance to currently available systems.

BRIEF SUMMARY OF THE INVENTION

The current invention may be described as a system for reducing the effects of unwanted external software ("malware") having a user computing device, a host computing device, and a limited communication link.

The user computing device has an operating system (OS) and a web browser.

The host computing device employs VM executable code for emulating a virtual machine, a virtual OS which runs on the virtual machine and a web browser adapted to run on the virtual OS.

The limited communication link is connected between the user computing device and the host computing device and is adapted to pass communication signals from input devices of the user computing device to the host computing device; and pass output communication signals of the host computing device to output devices of the user computing device thereby restricting malware from being introduced to the user computing device.

The current invention may also be described as a web-based malware mitigation system having a user computing device, and a host computing device and a communication link.

The user computing device includes input devices adapted to receive user input, and output devices adapted to display screen images.

The host computing device includes a CPU running software that mimics the operation of a different machine that is executing an application, causing it to interface with a remote server through a network.

The communication link connects the user computing device to the host computing device and only allows a certain format of communication in the direction of user's computing device and another format of communication from the direction of host computing device.

The current invention may also be described as a web-based malware mitigation system having a user computing device, a CPU running virtual machine OS that is a minimized Linux operating system, and a virtual communication link.

The user computing device has user input devices adapted to receive user input, and output devices adapted to display screen images.

The CPU runs a virtual machine OS that is a minimized Linux operating system that executes a web browser application, causing it to interface with a remote server through a network.

A virtual communication link connects the virtual machine to the user's computing device which only allows limited communications between the user's computing device and the virtual machine. The format may be port 22 format.

BRIEF DESCRIPTION OF SEVERAL VIEWS OF THE DRAWINGS

The above and further advantages may be better understood by referring to the following description in conjunction with the accompanying drawings, in which like numerals indicate like structural elements and features in various figures. The drawings are not necessarily to scale; emphasis instead being placed upon illustrating the principles of the concepts. For example, the dimensions of some of the elements in the figures may be exaggerated relative to other elements to help to improve understanding of various example embodiments. Also, common but well-understood elements that are useful or necessary in a commercially feasible embodiment are often not depicted to facilitate a less obstructed view of these various example embodiments.

DETAILED DESCRIPTION OF THE INVENTION

Theory

Figure 1:
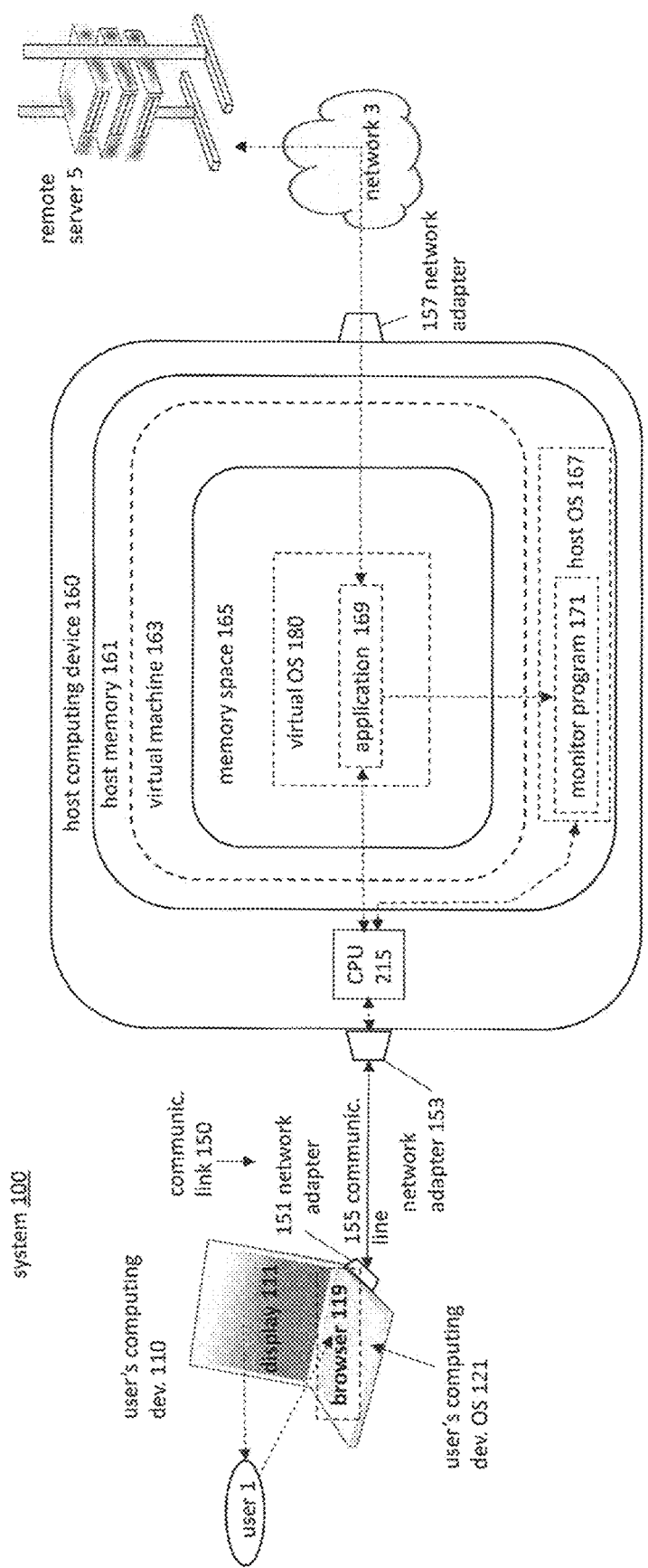
FIG. 1 is a schematic illustration of a system for mitigation of the effects of malware, according to one embodiment of the present invention.

With the plateau of processing; power that we've seen in recent years, and with the rise of virtualization in the server space, we believe that virtualization and isolation can be beneficial to users as well. Companies like VMWare and Citrix market their tools to IT departments and large businesses for the purposes of ease of management, redundancy, and most of all, security as described in Citrix Xenserver Version 7.0, Citrix, Fort Lauderdale, Fla., 2016, http://www.citri.com, VMWare NSX, VMWare, Palo Alto, Calif., 2017, http://www.vmware.com, and Dinaburg, Artem, Paul Royal, Monirul Sharif, and Wenke Lee, "Ether: Malware Analysis via Hardware Virtualization Extensions," in ACM Computer Communications Security, Va., 2008, DOI: 10.1145/1455770.1455779. This security is normally applied in a VDI (Virtual Desktop Infrastructure) architecture, meaning that part of the security comes from the actual processing being done off-site, but there is no reason that this concept cannot be applied to a single machine. Virtualization has been a solution for consumers in the past, such as in the instance of Apple's Classic Environment, used to run apps written for Mac OS 9 on the new Unix-based OS X for years by emulating a copy of OS 9 that was installed on the hard drive. This was described in Spinner, "*How to Run Classic (pre OSX) Apps on Intel Macs*", available on-line at http://www.macworld.com With a focus on security, this concept could be sensibly applied to the most common application type in use today: the web browser.

Isolating the web browser on a modern operating system would eliminate most common attack vectors. If malware is confined to only run on the virtual machine, it cannot cause any problem for the host machine user that would not be fixed by simply resetting the virtual machine (and therefore the browser) to a clean state.

The present invention may be implemented instead of attempting to implement social engineering by trying to teach safe computing practices to users that may have difficulty comprehending why and how they are important.

A problem with modern security is that we often cannot protect against a threat until it has already attacked at least one user. The current invention would prevent malware attacks, even if it is the first time they have been implemented.

Virtualization technology would allow software vulnerabilities to be exploited without posing a legitimate threat to the host OS. The current invention will not end the need for antivirus software, however it will provide a more, secure environment.

Implementation

A system is described that creates a single purpose virtual appliance running an application, such as a web browser, that has limited communications with the host computer. This significantly reduces the amount of common attack vectors reaching the host computer.

A similar result can be achieved by running a full operating system within a virtual machine; however, this has significantly increased overhead making it computationally intensive and slow.

The current system is superior to a full virtual operating system in both performance and effectiveness.

The current system minimizes virtualization overhead, as well as the threat of malware. We will discuss virtualization itself, as well as the merits of its application in terms of browser use. Then, we will discuss the security implications.

I. Virtualized Web Browser

A virtualized web browser provides several security benefits for an end user. As discussed earlier, the most common cause of security breaches is due to the users allowing download and execution of malware. Since the majority of malware is introduced to the host computer through the web browser, this is the software application which should be secured first. This is accomplished by running the browser on a virtual machine, isolated from the host computer, except for a single limited channel. This is referred to as 'virtualization of the web browser'.

The virtualization of a web browser essentially provides the user with an environment that is forgiving of such attacks. This is because every program that is downloaded through the browser is likely unaware that it is running within a virtual machine and is only able to access parts of BulwarkCore (stripped down OS) detailed below.

In addition to the security features provided by the virtualization, there is a small performance increase on average. A preferred embodiment is a Linux-based operating system that runs the application (browser).

This embodiment has a few advantages over just running the application on the host computer. First, Linux's memory management is more efficient than Windows memory management. Running the web browser in a virtual machine according to the current invention, can even prevent memory leakage, which is a common problem in web browsers today. In addition to the memory leakage, the superior memory management allows Bulwark Browser to sometimes use less memory than the browsers in a stock Windows image, as described in Singledecker Robert, "*TinyCore Linux Core Concepts*", TinyCore, 2013.

II. Bulwarkcore

The current invention employs a custom Linux distribution called BulwarkCore.

The current system utilizes the concept of creating a lightweight virtual machine to run a single application. It implements some of the ideas described in Yu Yang, Lap-Chung Lam, Hariharan Kolam, and Tzi-cker Chinch, "*Applications of a Feather-weight Virtual Machine*," in ACM SIGPLAN/SIGOPS international conference on Virtual execution environments, WA, 2008, 171-180.

The publication by C. Greamo, A. Ghosh, "*Sandboxing and virtualization: Modern Tools for Combating Malware*", IEEE Security Privacy, vol. 9, no. 2, pp. 79-82, March/April 2011 generally discusses the possibilities of utilizing virtualization in some manner to increase security.

The current system implements a virtual file system to prevent malicious content from being able to directly access the host computer.

The current system employs a virtual operating system referred to as BulwarkCore. This was derived using some of the ideas proposed by Singledecker, Robert in "TinyCore Linux Core Concepts", TinyCore, 2013. This is intended to run a proprietary browser. The current OS is built to run an app in a virtual environment, and forward output of that app to the host operating system. The current system employs an architecture similar to the TinyCore's "TCZ" extension format. Therefore, the current system can allow for the addition or removal of drivers, applications, and settings from outside of the OS. Since the current system only contains the drivers and software needed to display an app, the app's dependencies determine its size.

The stock image of the current system contains VirtualBox's Guest Additions, SSH, an X forwarding config, a network config, and a copy of Firefox, is about 130 MB, which is an acceptable size for any modern program, but significantly smaller than other operating systems.

This structure was chosen for several reasons. First, it allows a user to remove parts of the OS that are not necessary, or add ones that are, with ease. This is not only good for size concerns, it enhances security as well. The removal of services that are not needed reduces potential attack vectors for the virtual machine.

Secondly, it allows the user to update the browser or any of the services that are used without reinstalling or redownloading the entire image, and patches can be laid over from outside the virtual machine.

Finally, it only writes to directories that are approved in the configuration file at boot time, as indicated in Singledecker, Robert, "*TinyCore Linux Core Concepts*", TinyCore, 2013. This is an important distinction to make, as a common 'live CD' approach would not do this. All data would be lost on a reboot that was not made part of the image.

With this architecture, we can ensure that operating system files and browser data files are not changed, while user changes will persist in a temporary directory. This temporary directory can be cleared at any time, which will restore the BulwarkCore to the state it would be in if it were freshly installed or downloaded. The purpose of this is to give the user complete freedom over the configuration of the app within BulwarkCore, but not the ability to alter or damage the virtual machine.

In recent years, the world has seen a resurgence in web-based malware. However, there has not been a suitable solution to prevent users from falling for phishing scams, and inadvertently downloading malware. Bulwark Browser presents a fresh solution to the problem of web-based malware. It utilizes single app virtualization to isolate the web browser from the host computer. As discussed below, a configuration program was also created to properly set up Bulwark Browser on the host machine. After the configuration is finished, it runs as a featherweight virtual machine through the utilization of the OS, BulwarkCore. To display the information being browsed by the user, SSH and X forwarding were used to send the user an implementation of Firefox that mimics the controls of the host OS. This was done to provide the user with a seamless experience such that they may not even know they are using a virtual machine.

FIG. 1 is a schematic illustration of a system 100 for mitigation of the effects of malware, according to one embodiment of the present invention. Here, a user 1 intends to run a browser that interacts through a network 3 to one or more network entities, such as remote server 5. As indicated above, browsers tend to pick up or inadvertently allow malicious programs to be uploaded into the system 100. Therefore, system 100 includes a 'sacrificial' host computing device 160. In this embodiment, it is a hardware implementation. It includes hardware host memory 161 for storing and running executable code.

User computing device 110 links to host computing device 160 through a network link 150. Network link 150 includes a network adapter 151 connected to the user computing device 110. It also includes a network adapter 153 on host computing device 160 coupled to network adapter 151 by a communication line 155.

Host computing device 160 also has a network adapter 157 which allows it to connect to user computing device 110 and a network entity, such as remote server 5 through network 3.

User computing device 110 is connected to host computer 160 via a communication link 150. This allows only specific types of communication. Here, it is set up to communicate via a port 22 format. This allows signals intended to drive output devices, such as computer monitors, speakers and printers to pass from host computing device 160 to user computing device 110. For example, an image of the screen may be sent to the user's computing device 110 and displayed directly on display 111 of user's computing device 110. Similarly, keys typed on the keyboard, locations pointed to by the mouse and locations clicked upon by the mouse are considered user input and are sent over the communications link 150 to the host computing device 160 to be provided to virtual OS 180 and ultimately provided as input to application 169.

Figure 2:
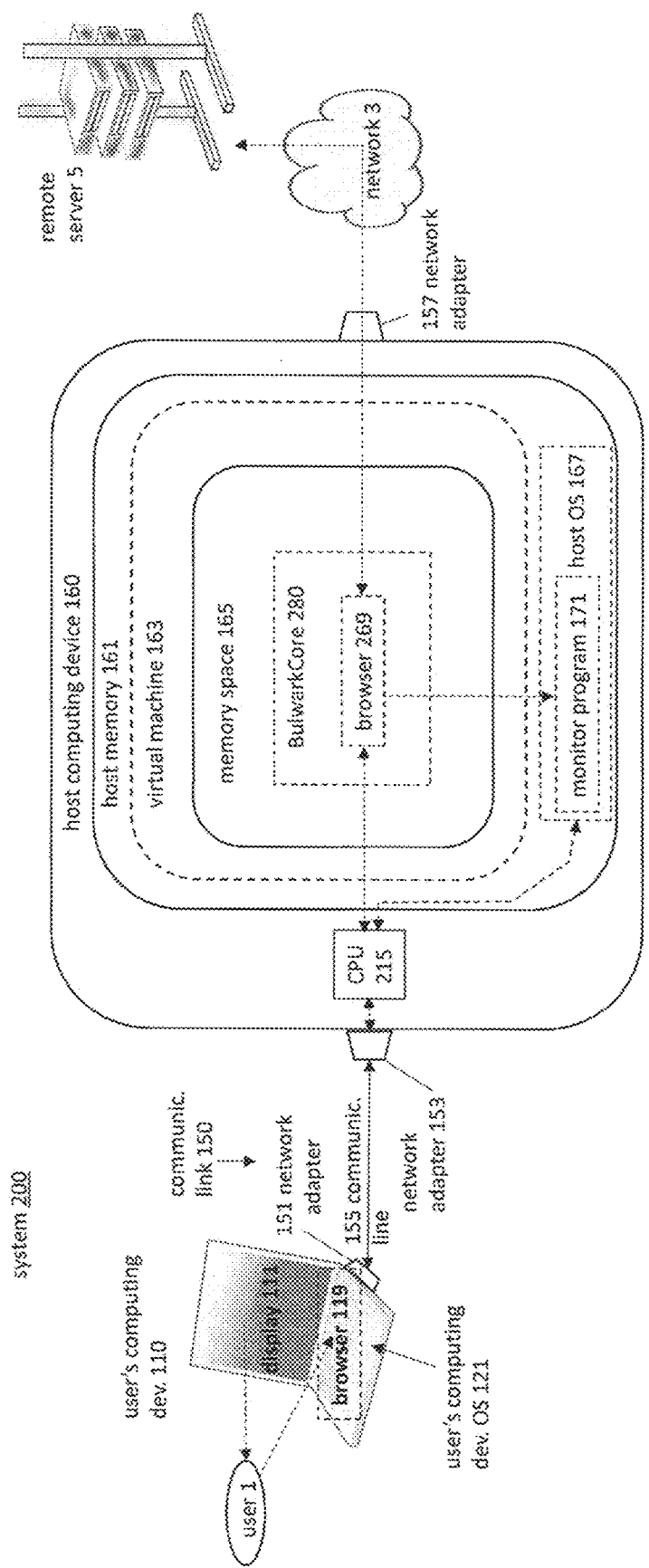
FIG. 2 is a schematic illustration of a system for mitigation of the effects of malware, according to another embodiment of the present invention.

Communications link 150 also allows user computing device 110 to send signals from input devices of user computing device 110 through communication link 150 to the host computing device 160 to be used by application 169 such as browser 269, as shown in FIG. 2.

Therefore, before the system may be implemented, it must be set up. A host Operating System (OS) 167 is loaded into host memory 161 of host computing device 160 and started. Host memory 161 is loaded with software emulating a virtual machine 163. The virtual machine emulates various pieces of hardware that are required.

Host memory 161 also has a portion of memory designated as a memory space 165. This portion of memory is loaded with executable code referred to as a virtual operating system (OS) ISO of the virtual machine 163. This is the unique OS specifically developed for the current invention. It is small so that it fits in memory of the host computing device 160. It was created by eliminating unnecessary routines and functionality that was not required. This allows it to run faster and reduces the chances of picking up malicious software as it runs.

An application 169 is loaded and runs on top of the virtual OS 180.

A monitor program 171 is in the host memory 161 outside of the virtual machine 163 and can independently monitor the actions of the virtual machine 163. It checks to see if the virtual machine 163 is trying to access memory outside of memory space 165 or tries to change code in host OS 167, virtual OS 180 or application 169. It also looks for unusual long processing loops, and communication with network entities when it is unnecessary for the functions it is performing.

If anything suspicious is verified as unusual processing, the virtual machine 163 may be erased (along with any malicious code) and reloaded.

Viruses and other malware are typically executable code. These only execute in a compatible environment. For example, malware designed to attack a browser for a Linux-based system, will only run on Linux-based systems.

Similarly, malware designed to attack a browser which only runs on Microsoft Windows-based systems, will only run on Windows-based systems and not on Linux-based systems.

Therefore, in a preferred embodiment of the current invention, host OS 167 should be different from virtual OS 180, and application 169 should be compatible with (able to run on) virtual OS 180 but is not compatible (does not run on) host OS 167.

As indicated above, there may be a configuration area in the host memory 161 in which configuration and setup preferences may be stored. In an optional embodiment, this may remain unaltered when the virtual machine has been erased and re-loaded. These may then be used to configure the newly loaded virtual machine 163.

FIG. 2 is a schematic illustration of a system 200 for mitigation of the effects of malware, according to another embodiment of the present invention. All elements of FIG. 2 that have the same reference number as those of FIG. 1 function in the same manner as described above. However, in this embodiment, the virtual OS 180 is BulwarkCore 280. Also, application 169 is a web browser 269.

Therefore, BulwarkCore 280 now has the limited functionality, small 'footprint' and speed which allow this emulation to perform with the speed and responsiveness that are on par with conventional systems not running emulation.

As also indicated above, BulwarkCore 280 is derived from Linux OS and therefore is immune to malware which runs on Windows systems. Therefore, if malware which runs on Windows OS somehow enters system 200, and 'leaks' into BulwarkCore 280, it will have little or no effect.

If monitor program 171 senses unusual performance, it can wipe away the entire virtual machine 163, including BulwarkCore, and reload it eliminating any malware threats.

Figure 3:
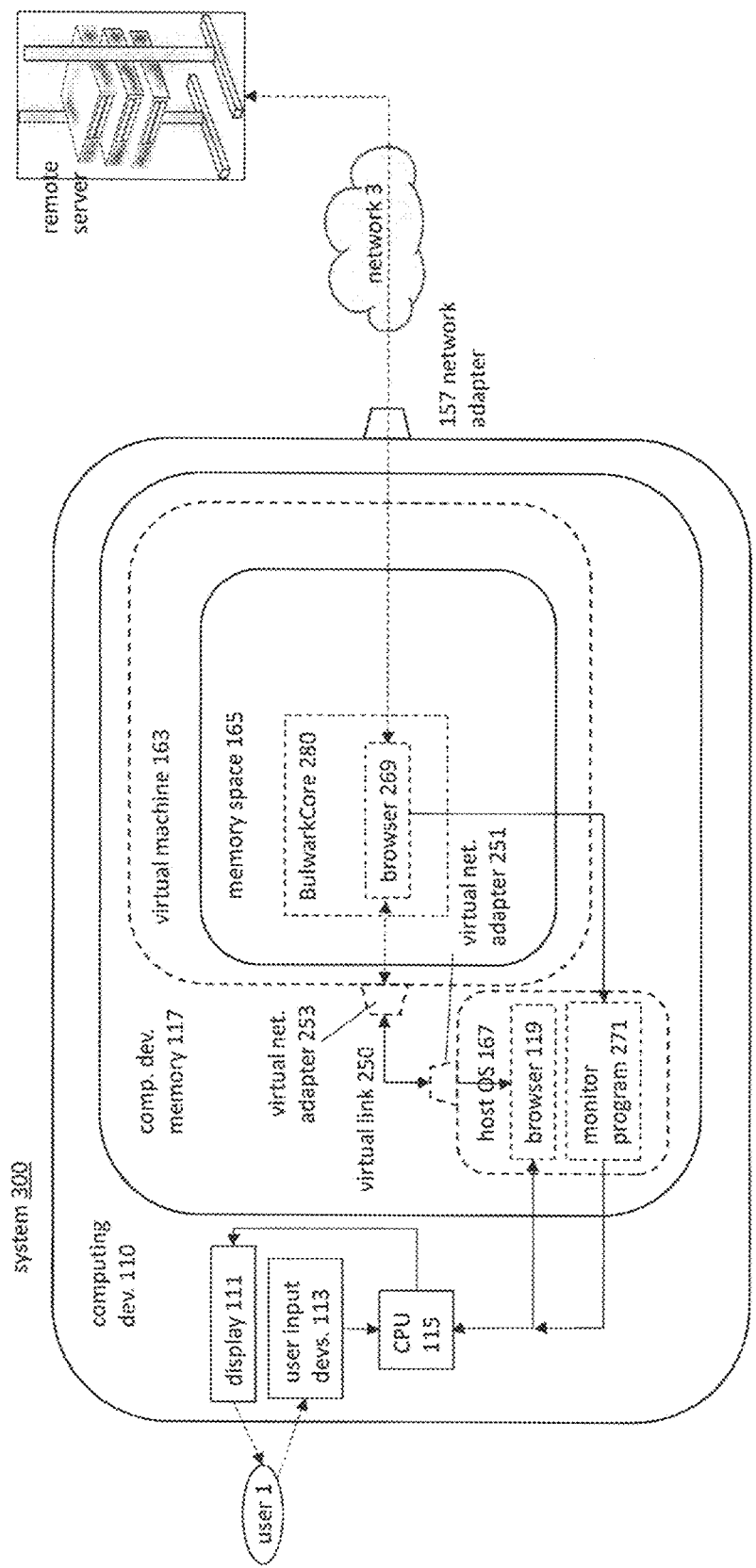
FIG. 3 is a schematic illustration of a system for mitigation of the effects of malware, according to still another embodiment of the present invention.

FIG. 3 is a schematic illustration of a system 300 for mitigation of the effects of malware according to still another embodiment of the present invention. In this embodiment, there is no host computing device 160 or separate host memory 165.

Instead, computing device memory 117 of computing device 110 is partitioned to allow the operating system (OS) of computing device 110 and applications, such as browser 119, to be loaded.

A portion of computing device memory 117 is allocated to virtual machine 163. The virtual machine 163 includes memory space 165, BulwarkCore 280, browser 269 which function as described in connection with FIGS. 1 and 2.

System 300 also includes a monitor program 271 that functions in the same manner as monitor program 171 of FIGS. 1 and 2, but in addition, monitors if the browser 269, or other process running in virtual machine 163, tries to access any memory locations of computing device memory 117 that are outside of memory space 165. This will include any potential changes to OS 167 and browser 119.

Figure 4:
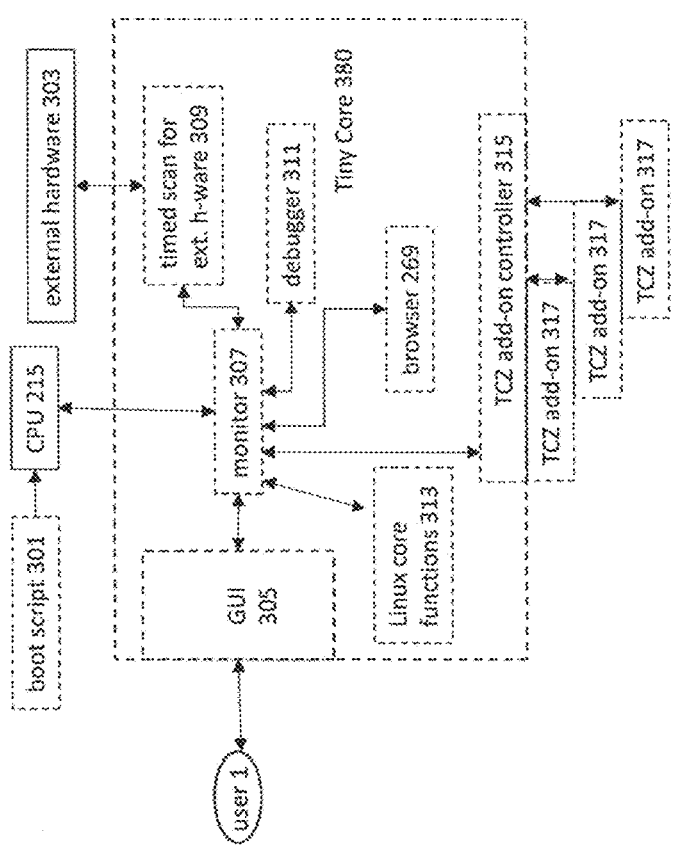
FIG. 4 is a simplified schematic illustration of the major functional blocks of an operating system.

FIG. 4 is a simplified schematic illustration of the major functional blocks of an operating system. These may be instructions executed by an active element, such as CPU 215. This operating system may be one of several different kinds; however, a Linux Operating System referred to as "TinyCore" will be described here.

An operating system 380 is designed to be loaded into hardware when the boot script is executed. Since it is designed to interact with a user through input and output devices connected through a graphical user interface (GUI) 305, it also includes a debugger 311 to provide snapshots of memory and otherwise report on the state of a computing device running user-developed code.

The operating, system 380 employs a monitor program 307 which, when run, controls and sequences events with the operating system.

The operating system 380 includes a routine 309 that performs a timed scan for external hardware 303 periodically. This allows the system to recognize and connect to hardware added to the system after it boots up.

The operating system 380 also includes a TCZ add-on controller 315 which allows the user to add on other modular programs, referred to as "TCZ add-ons", For example, the TCZ add-ons may be drivers to various added devices, such as a printer or scanner.

As indicated above, a standard operating system was chosen to run within the virtual machine 163 of FIGS. 1-3. Preferably, this operating system would be from a different OS family as that running in user's computing device 110. For example, if the user's computing device 110 is running a Windows Operating system, it would be beneficial to use an operating system which is in the Linux, Unix, or Apple OS families. In the current description, we will have user's computing device 110 using a Windows OS, and the OS of FIG. 4 being a Linux version, preferably TinyCore Linux Operating System.

One problem with using virtual machines, or emulation software is that it slows down the system due to the additional overhead computing required. Therefore, it is advantageous to reduce the complexity and overhead of the operating system to speed up processing and reduce complexity. Therefore, unnecessary portions of the operating system of FIG. 4 must be removed.

Figure 5:
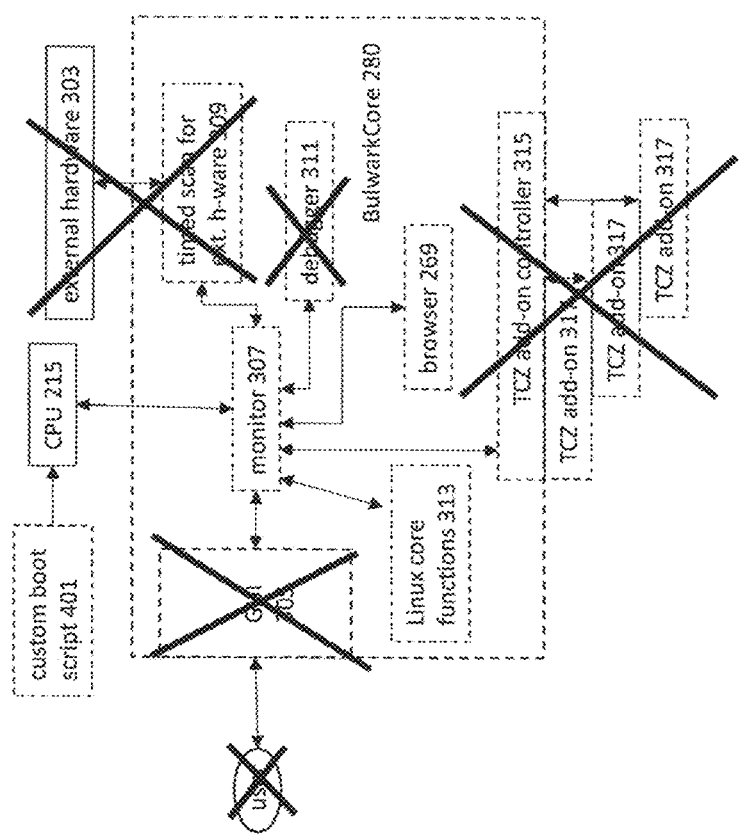
FIG. 5 is a simplified schematic illustration showing the major functional blocks of the BulwarkCore operating system compatible with the current invention.

FIG. 5 is a simplified schematic illustration showing the major functional blocks of the BulwarkCore operating system compatible with the current invention.

Since this operating system will be implemented in a virtual machine 163 of FIGS. 1 and 2, and not have to interact with users, the operating system 380 will receive its input from user's computing device 110. Therefore, the operating system 380 does not require a graphical user interface (GUI) 305.

The virtual machine 163 will not be connected to a fixed set of hardware and not need to have 'hot plugged' hardware. Therefore, any routines that scan for external hardware can be deleted.

For the final run-time operating system, there is no need for a debugger 311. Therefore, the debugger 311 can be eliminated after the operating system 380 has been finalized.

Therefore, a custom boot script 401 was written to only load elements of the operating system 380 which are required to run an application, such as the browser 269.

The final remaining routines, such as Linux core functions 313 and monitor 307 are listed in the custom boot script 401, to be loaded. The remaining functional routines is referred to as BulwarkCore 280 of FIGS. 2 and 3. The final BulwarkCore 280 will then be executed by CPU 215.

Although a few examples have been shown and described, it will be appreciated by those skilled in the art that various changes and modifications might be made without departing from the scope of the invention, as defined in the appended claims.

What is claimed is:

1. A system for reducing the effects of unwanted external software ("malware") comprising:
   a. a user computing device comprising:
      i. an operating system (OS) and
      ii. a web browser;
   b. a host computing device comprising:
      i. VM executable code for emulating a virtual machine;
      ii. a virtual OS which runs on the virtual machine, wherein executable code running on the virtual OS is not compatible with the operating system of the user's computing device;
      iii. a web browser adapted to run on the virtual OS;
   c. a limited communication link connected between the user computing device and the host computing device adapted to:
      i. pass communication signals from input devices of the user computing device to the host computing device; and
      ii. pass output communication signals of the host computing device to output devices of the user computing device thereby restricting malware from being introduced to the user computing device.

2. The system of claim 1, further comprising a monitor program which monitors the operation of the host computing device and erases the virtual machine if it is determined that it is not acting normally indicating that it may be running malware.

3. The system of claim 1, wherein communications link further comprises:
   a. a network adapter on the user computing device for passing signals to the host computing device representing user input received by the input devices; and
   b. a network adapter on the host computing device for passing output signals from browser to be implemented on output devices of the user computing device.

4. A web-based malware mitigation system comprising:
   a) a user computing device comprising:
      input devices adapted to receive user input, and
      output devices adapted to display screen images;
   b) host computing device comprising:
      a CPU running software that mimics the operation of a different machine that is executing an application, causing it to interface with a remote server through a network,
      wherein the software running on the CPU is a virtual machine OS that runs software that is not compatible with a host operating system of host computing device,
      wherein executable code running on the virtual machine OS is not compatible with an operating system of the user's computing device; and
   c) a communication link connecting user computing device and host computing device which only allows a certain format of communication in the direction of user's computing device and another format of communication from the direction of host computing device.

5. The web-based malware mitigation system of claim 4, wherein the execution application running on the virtual machine OS is not compatible with the host OS of host computing device.

6. The web-based malware mitigation system of claim 4, wherein the certain format of communications in the direction of the computing device is a format that allows for screen shots to be communicated in the direction of the user computing device.

7. The web-based malware mitigation system of claim 4, wherein the certain format of communications from the direction of the user's computing device is a format that allows for keystrokes to be communicated in the direction from the user computing device.

8. The web-based malware mitigation system of claim 4, wherein the executing application is a web browser.

* * * * *